April 9, 1957 G. C. PAXTON 2,787,789
BOX-PART ASSEMBLING AND NAILING MACHINE
Filed Nov. 21, 1955 10 Sheets-Sheet 1
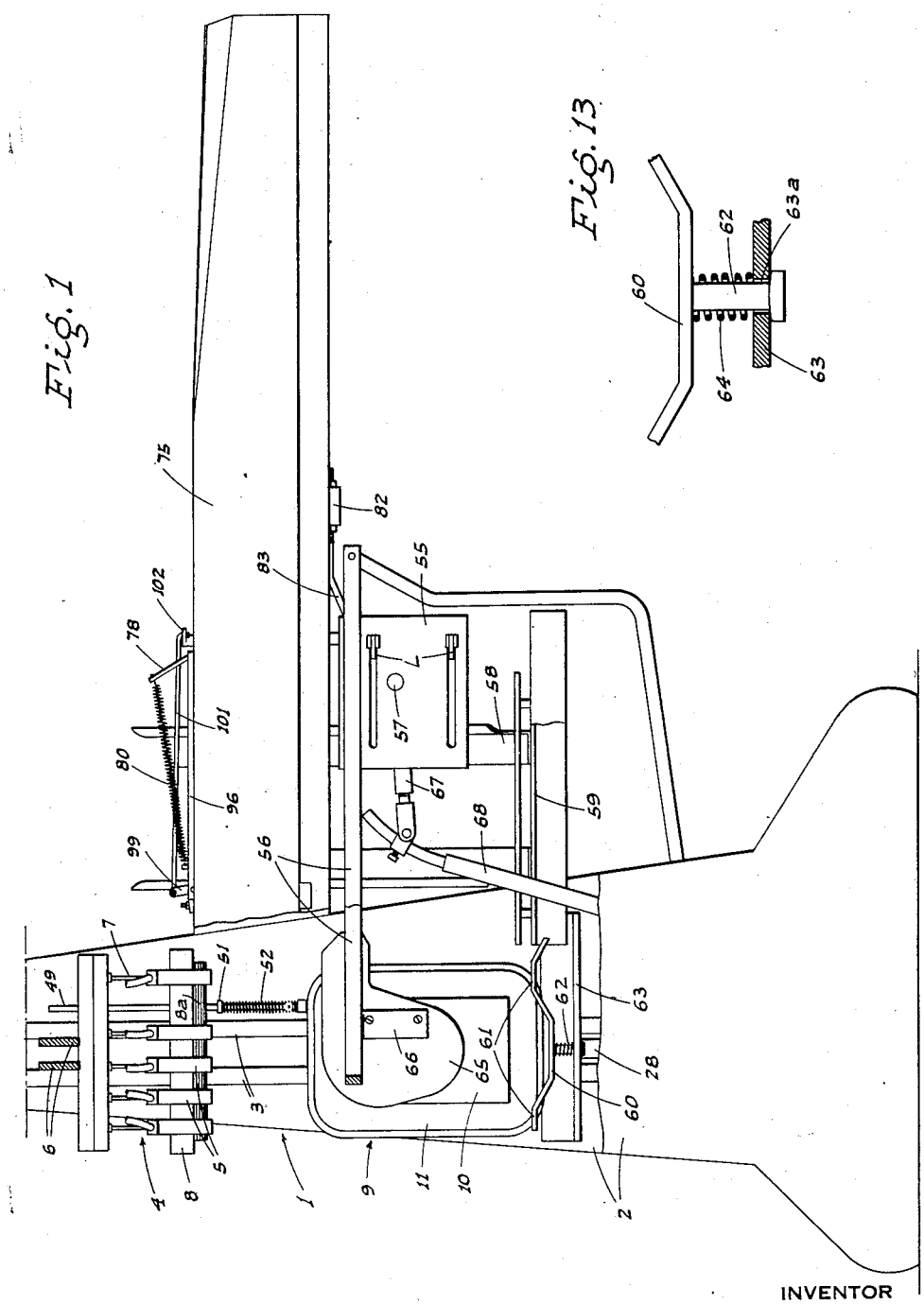
INVENTOR
G. C. Paxton
BY
ATTYS

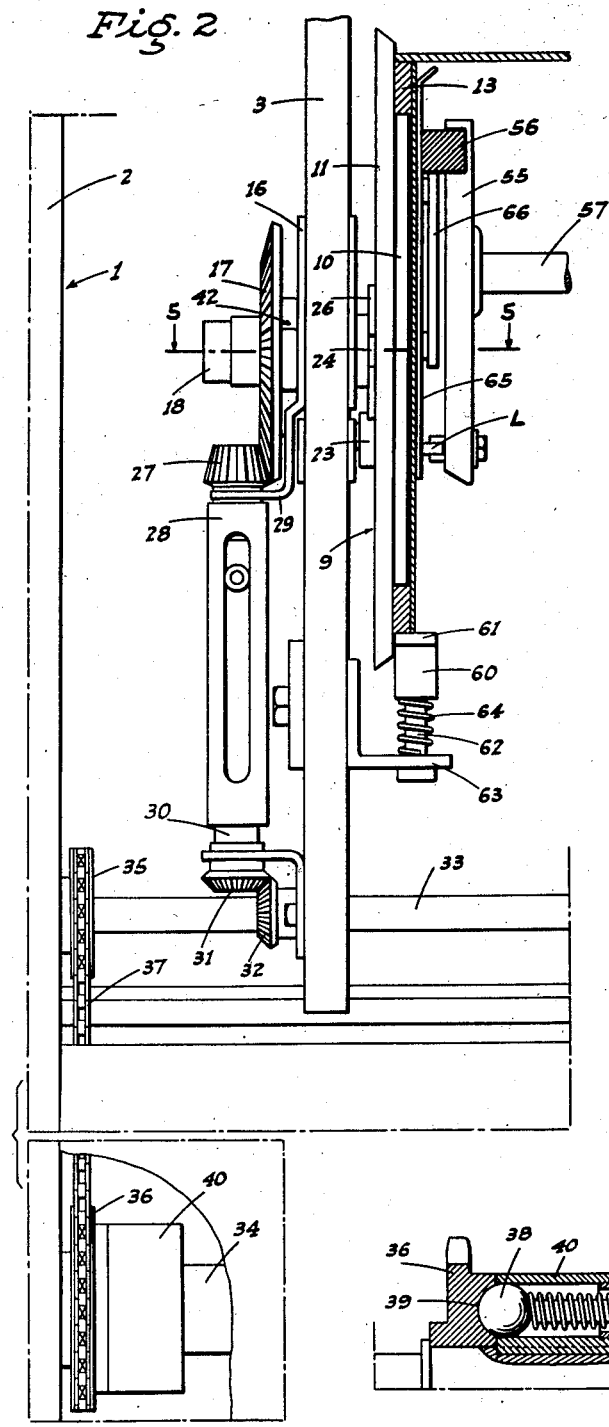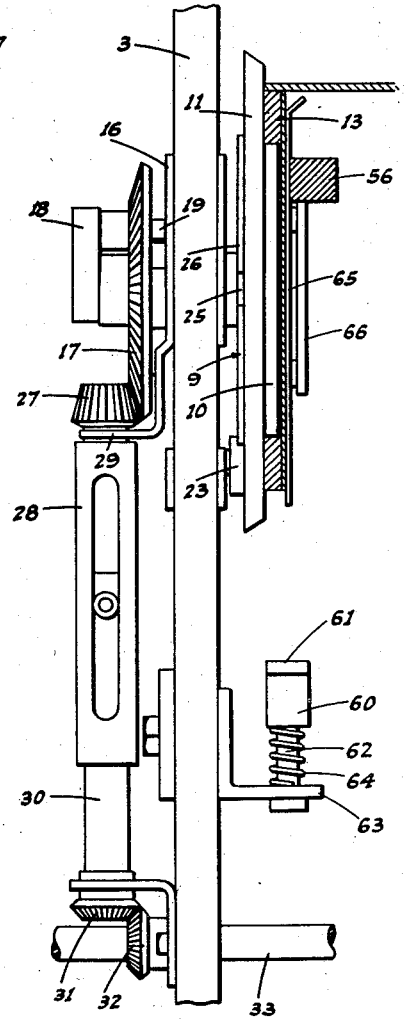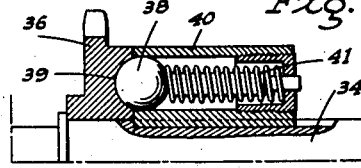

April 9, 1957 G. C. PAXTON 2,787,789
BOX-PART ASSEMBLING AND NAILING MACHINE
Filed Nov. 21, 1955 10 Sheets-Sheet 4
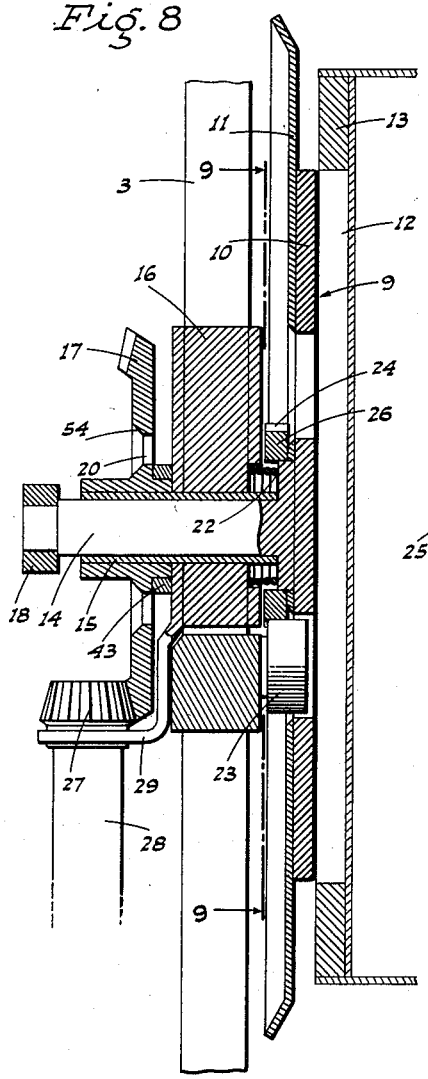
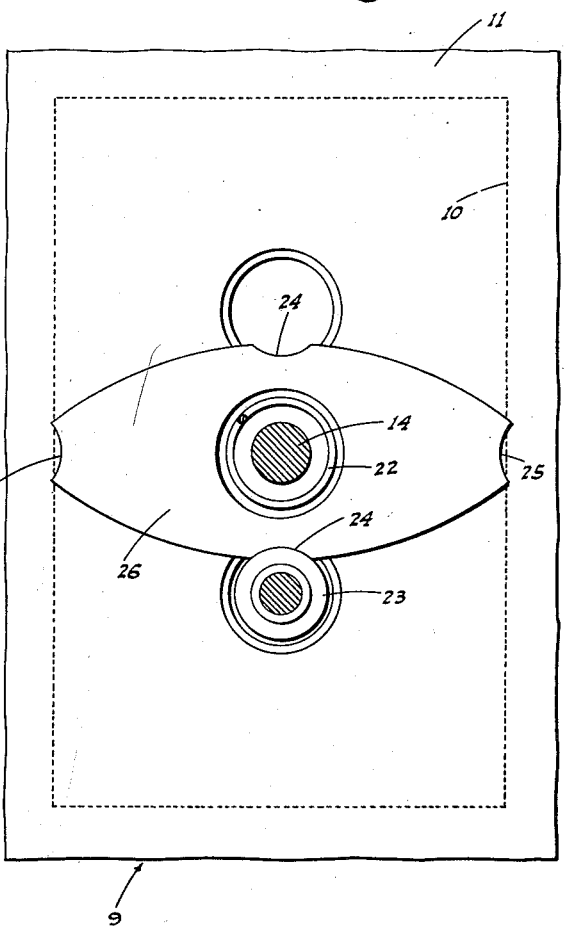
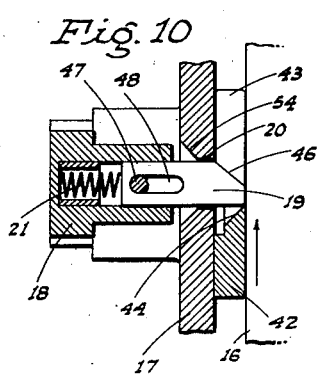
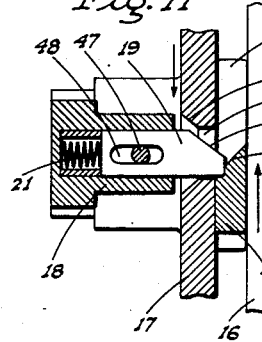
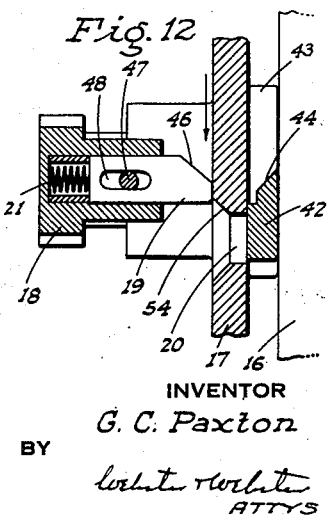
INVENTOR
G. C. Paxton
BY
ATTYS

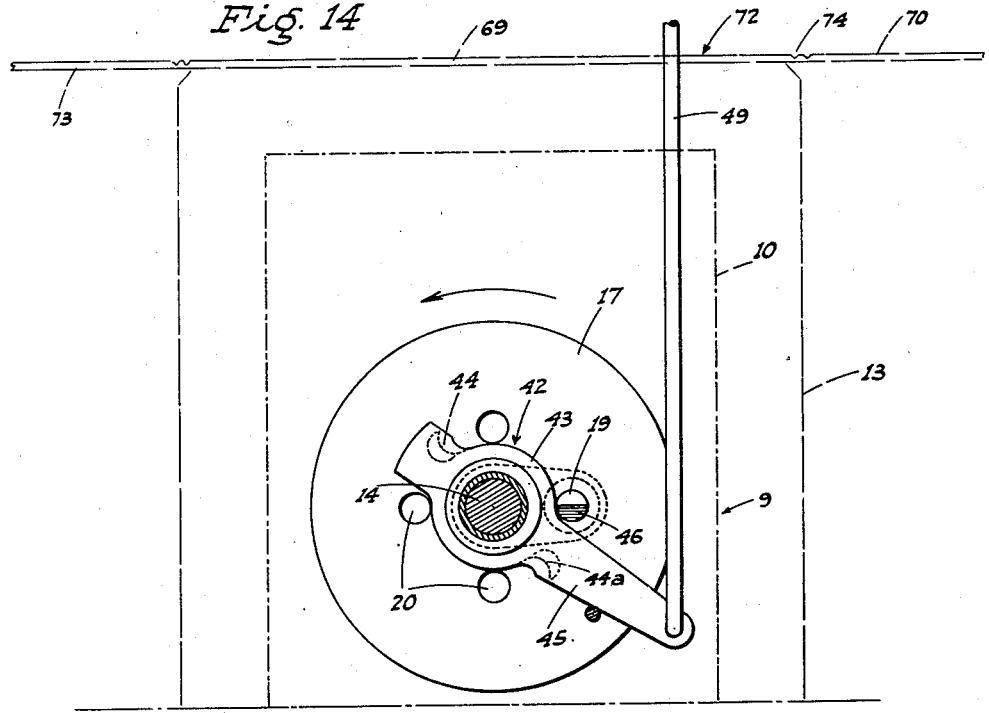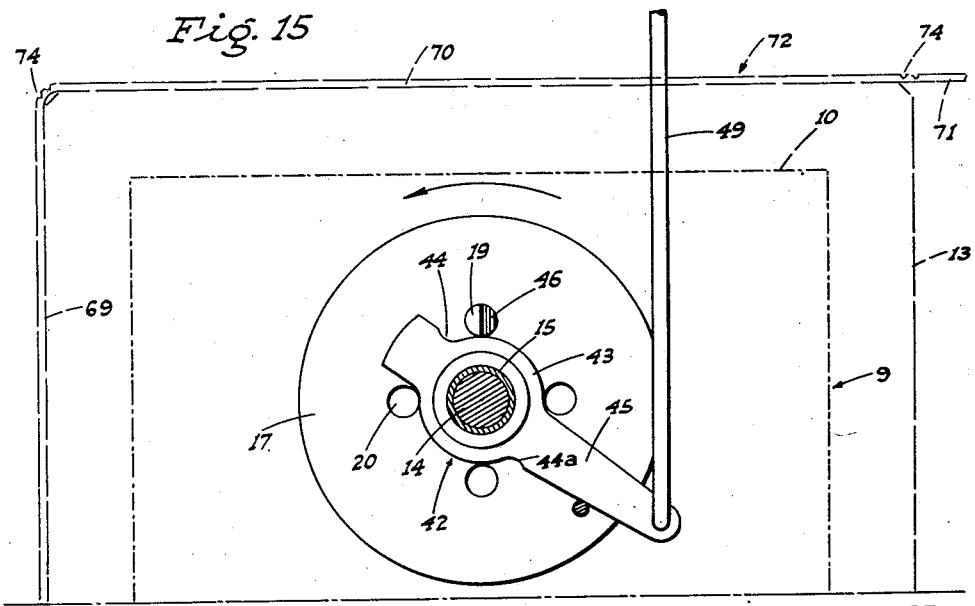

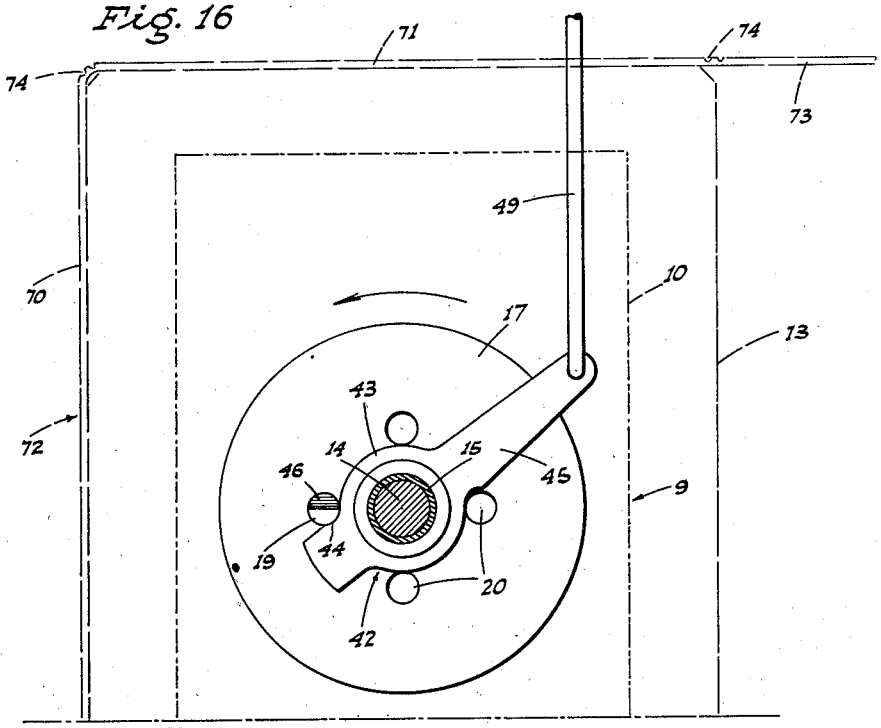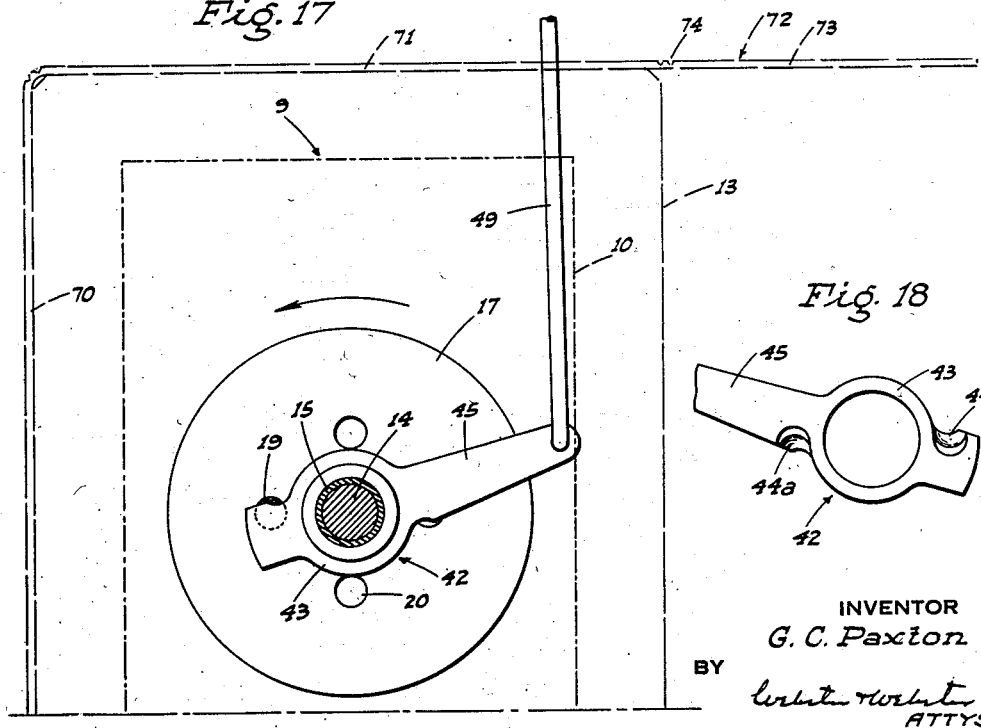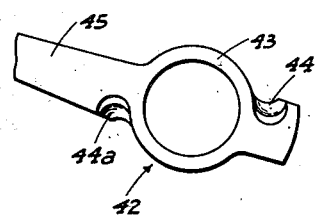

April 9, 1957 G. C. PAXTON 2,787,789
BOX-PART ASSEMBLING AND NAILING MACHINE
Filed Nov. 21, 1955 10 Sheets-Sheet 7
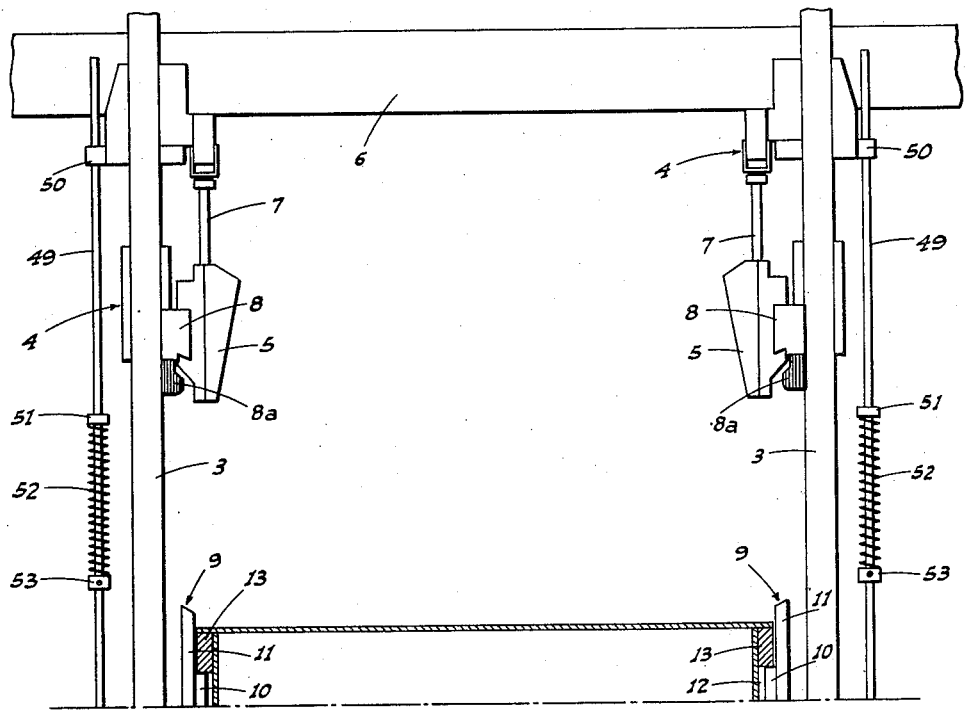
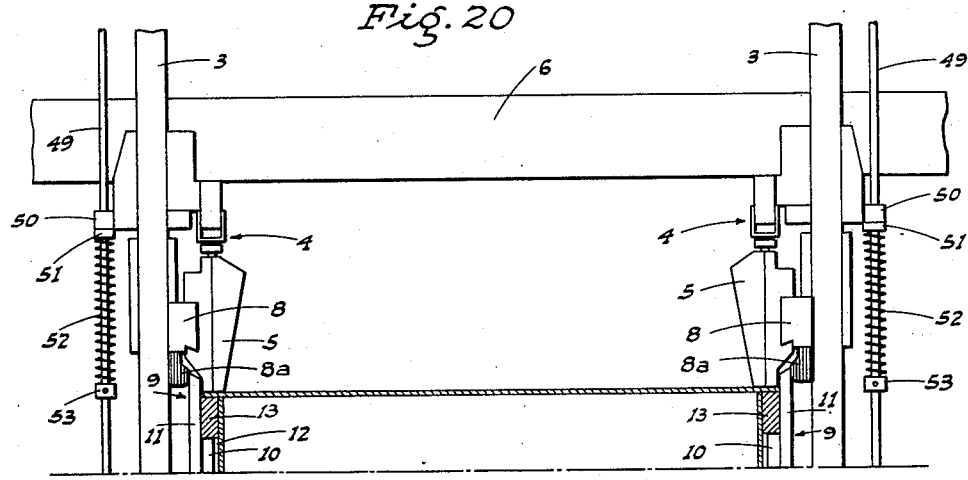
INVENTOR
G. C. Paxton
BY
ATTYS

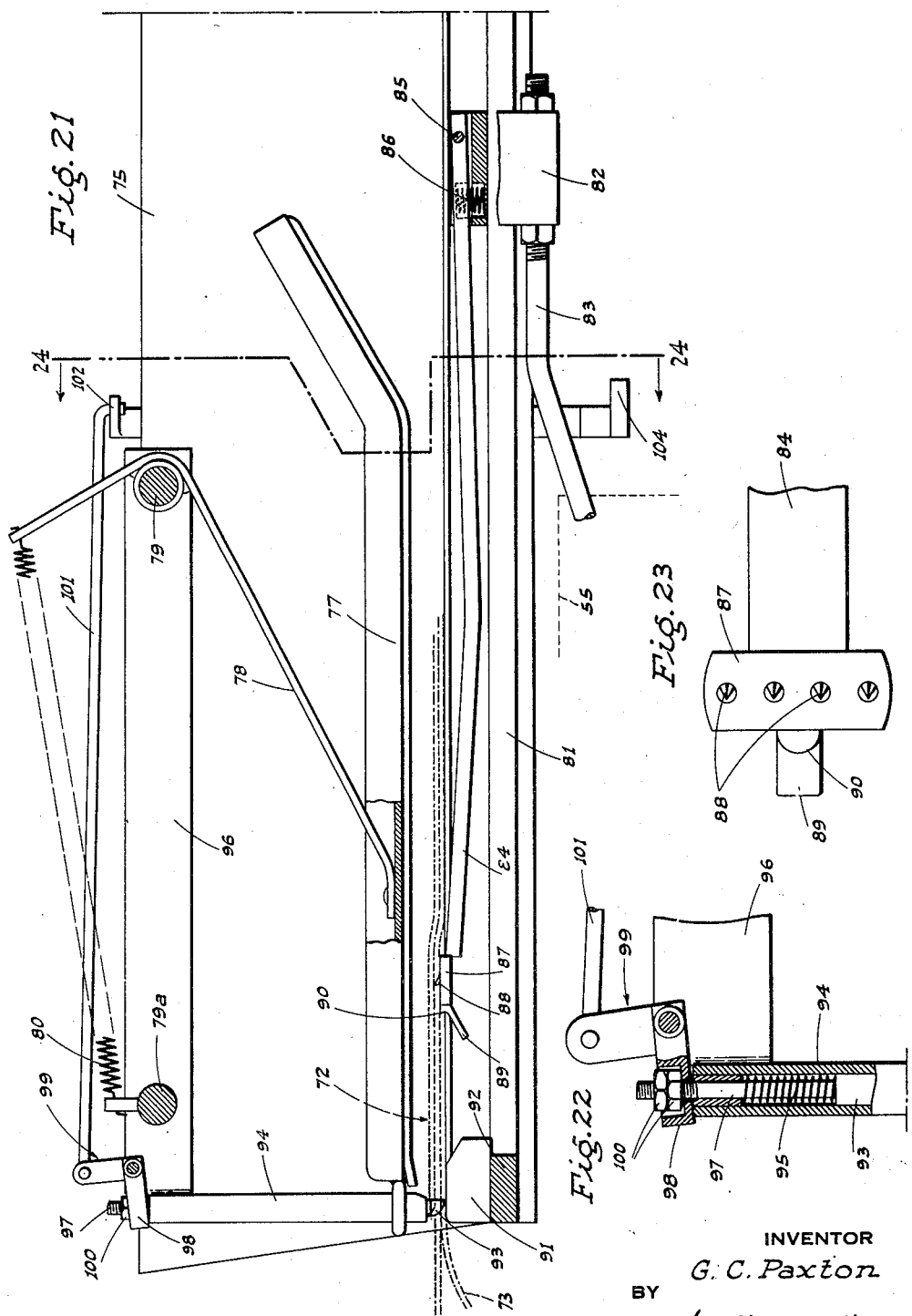

April 9, 1957  G. C. PAXTON  2,787,789
BOX-PART ASSEMBLING AND NAILING MACHINE
Filed Nov. 21, 1955  10 Sheets-Sheet 9

INVENTOR
G. C. Paxton
BY
ATTYS

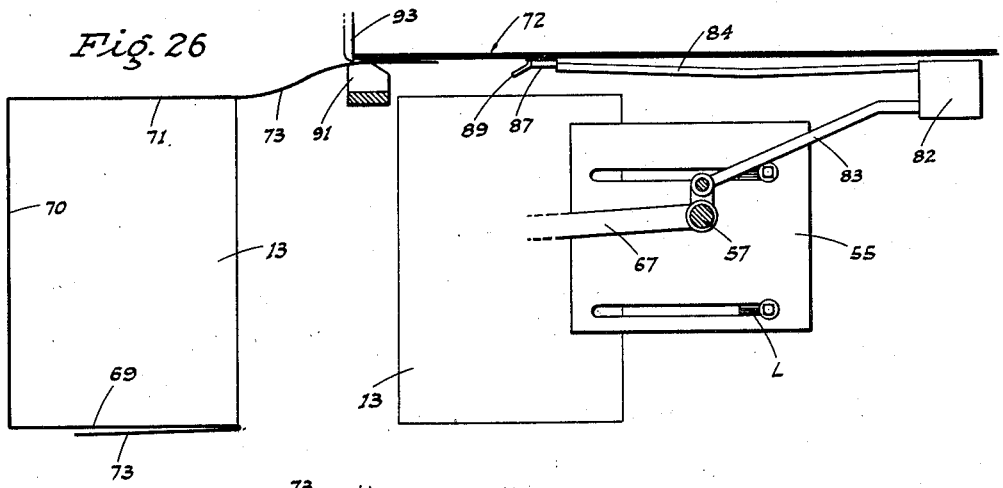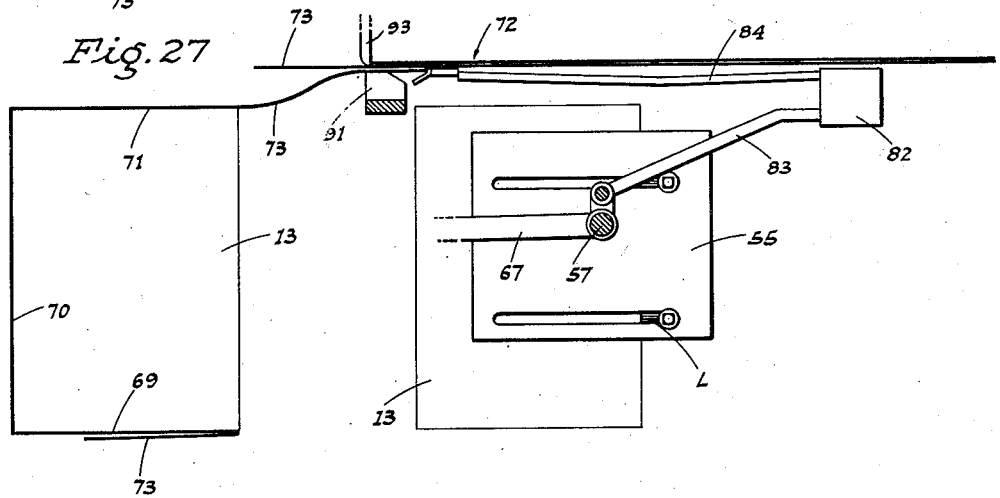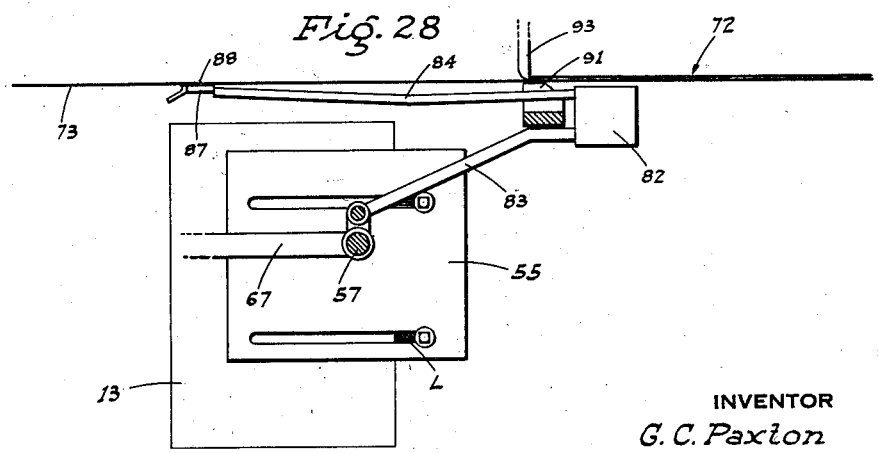

United States Patent Office 2,787,789
Patented Apr. 9, 1957

2,787,789
BOX-PART ASSEMBLING AND NAILING MACHINE

Gerald C. Paxton, Sanger, Calif., assignor to General Nailing Machine Corporation, Sanger, Calif., a corporation of California Application November 21, 1955, Serial No. 547,898

24 Claims. (Cl. 1—127)

This invention relates to improvements in the manufacture of crates or boxes for produce of various kinds, and particularly to a machine for assembling and nailing together the parts of a box which comprises rigid rectangular end frames, and what may be termed a "wrap-around sheet of relatively rigid material," which forms— as a single continuous unit—the sides, bottom, and cover flaps of the box when completed.

Such a box, generally, except for the inclusion of open or expoesd rectangular frame type ends which are shown in one form in my United States Patent No. 2,557,889, is disclosed in my pending application Serial No. 521,608, filed July 12, 1955, now Patent No. 2,738,506, dated March 20, 1956. In said application, however, the wrap-around sheet was pulled forwardly by hand after the box ends had been fed into position for nailing.

The principal object of the present invention is to provide a machine which embodies, with the nailing units and certain features of the box-end feeding and locating mechanisms of my United States Patent Nos. 2,557,889 and 2,649,582 by means of which the box-ends are fed to the initial nailing position, a novel structural assembly arranged to function so that at the same time one of the wrap-around sheets is fed over the upper nailing edge of the positioned box ends for nailing thereto.

A further object is to provide means—operative in timed relation with actuation of the nailing units—for rotataing the box ends through a quarter turn subsequent to each nailing operation; such rotation of the box ends pulling the sheet so that a portion of the latter then covers the upper edges of the box ends (then exposed to the nailing units upon such partial rotation of the box ends) for nailing of the sheet to the last named upper edges of the box ends.

The box ends, while rectangular, are not square, and another object of this invention is to provide means whereby as the box ends are intermittently part-turned, as above recited, they will also be raised or lowered as the case, may be so that their upper edges will always be located—for nailing—at the same level.

The machine includes rotary anvils shaped to enter and substantially fit the openings in the rectangular frames of the box ends, and by means of the rotation of which anvils the box-ends are part-rotated as above set forth. Therefore, a further object of the invention is to provide means whereby the anvils will be automatically laterally advanced, and then retracted, in order to allow the box ends to be initially fed into nailing position, to be then engaged by the anvils to supoprt the box ends for nailing and to rotate the same, and to lastly release the box ends from the anvils in order to allow of free movement of the completed box out of the machine.

The mats or wrap-around sheets for the boxes—one for each box—are stacked in flat relation in a hopper, the lowest sheet being the one engaged by the feeding means; the hopper including a self-closing gate normally preventing longitudinal shifting of a sheet from the hopper in advancing or feeding direction.

A further object of the invention is to provide means—functioning automatically with the operation of the sheet and box-end feeding mechanisms whereby the gate will be opened, and held open—for the escape of the leading end of the lowest sheet as pushed by the feed means—only as said feed means initially engages and advances the sheet.

It is also an object of the invention to provide a practical, reliable, and durable box-part assembling and nailing machine, and one which will be exceedingly effective for the purpose for which it is designed.

These objects are accomplished by means of such structure and relative arangement of parts as will fully appear by a perusal of the following specification and claims.

In the drawings:

Fig. 1 is a fragmentary side elevation, partly broken away and in section, of my improved box making machine in an empty condition; the box-end anvils being shown in their initial position and with the wrap-around sheet feeding means fully retracted.

Fig. 2 is a fragmentary enlarged end elevation, partly in section, showing particularly the drive for one of rotating anvils; the latter being in its up-ended lowered position and with a box-end engaged with the anvil.

Fig. 3 is a similar view, showing the anvil as turned 90° in its raised position.

Fig. 4 is an enlarged fragmentary transverse section, showing the releasable connection between the initial drive shaft and the initial drive sprocket of the anvil rotating means.

Fig. 8 is a view similar to Fig. 6, but showing the anvil turned 90° from the position of Fig. 6, and with said anvil retracted from the completed box to release the latter for removal from the machine.

Fig. 9 is a fragmentary sectional elevation on line 9—9 of Fig. 8.

Figs. 10–12 are fragmentary sections, substantially on line 10—10 of Fig. 5, showing the successive retracting or releasing movements of the anvil-gear latch pin.

Fig. 13 is an enlarged fragmentary elevation showing the mounting of each box-end support below the corresponding anvil.

Figs. 14–17 are somewhat diagrammatic elevations showing the successive positions of each anvil and the box-end supported thereby from the start to the final discharge position of the box end, and showing the relationship of the latch-pin retracting cam to the pin and the final action of said cam on the pin.

Fig. 18 is a fragmentary elevation of the latch-pin retracting cam member, looking at the working face of said member.

Fig. 19 is a fragmentary end elevation of the machine, showing the nailing chucks fully raised and with the box-parts to be nailed on the anvils below.

Fig. 20 is a similar view, but showing the chucks and nailing plungers lowered and in engagement with the box parts.

Fig. 21 is a fragmentary enlarged sectional elevation of the box mat or sheet hopper and the sheet feeding mechanism associated with said hopper; said mechanism being shown in its initially advanced position.

Fig. 22 is a fragmentary enlarged sectional elevation of the sheet-stop and the adjacent portion of the lifting mechanism thereof.

Fig. 23 is a fragmentary enlarged plan view showing the sheet engaging and feeding plate.

Figs. 26–28 are diagrammatic elevations showing the various advancing positions of the box-end and sheet feeding unit and the box parts engaged thereby.

Figure 5:
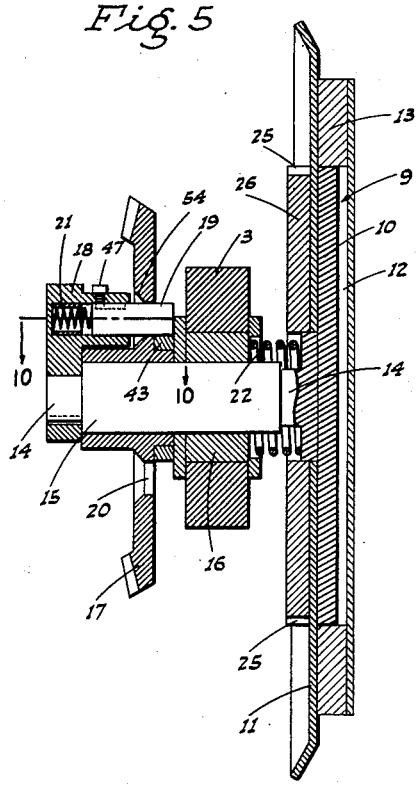
Fig. 5 is a fragmentary sectional plan, substantially on line 5—5 of Fig. 2, showing the anvil as latched to the drive gear.
Figure 6:
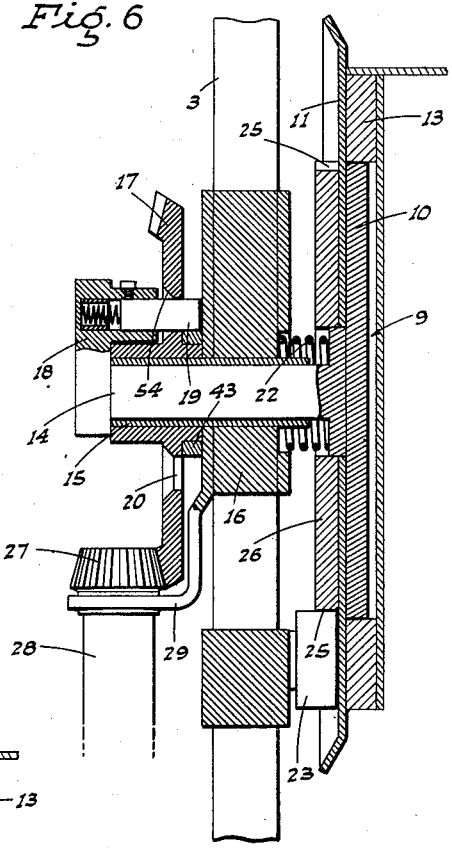
Fig. 6 is a fragmentary transverse sectional elevation of an anvil and its drive means, with said anvil in the position shown in Fig. 3.
Figure 7:
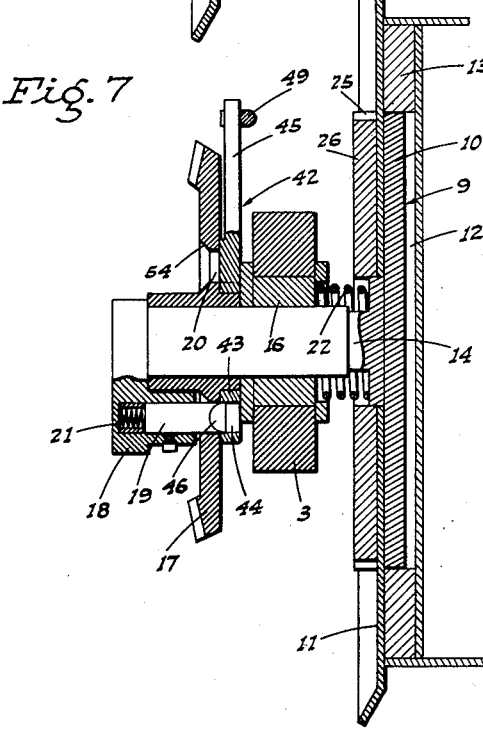
Fig. 7 is a fragmentary sectional plan in the same zone as Fig. 5, but showing the anvil turned 180° and with the latch for the drive gear as partially retracted.

Referring now more particularly to the drawings, and to the characters of reference marked thereon, the nailing machine depicted is the same, in its main essential features, as that shown in my United States Patent Nos. 2,557,889 and 2,649,582, and hence comprises a main upstanding frame, indicated generally at 1, and which includes transversely spaced uprights or legs 2 between which the box is made.

Mounted in the frame, in transversely spaced relation between the legs 2, are vertical guide and mounting posts 3 on which the nailing units, indicated generally at 4, are slidably mounted. Each unit comprises a row of nailing chucks 5; said units being reciprocated vertically through a stroke of fixed length by a top transverse driving bar 6. This bar is driven in the same manner as shown in the aforementioned patents, so that the chucks are first lowered, and then the nailing plungers 7 descend through the chucks; said chucks being mounted on a horizontal longitudinal bar 8 arranged in guided relation with the post 3.

Below the nailing units are rotary anvils of rectangular but non-square form, indicated generally at 9, and each including a rigid heavy plate 10 transversely alined with the adjacent row of chucks, and a relatively large backing plate 11 symmetrical to plate 10 and forming a surrounding skirt; said skirt being disposed between the plate 10 and the adjacent frame upright 2, as clearly shown.

Figure 29:
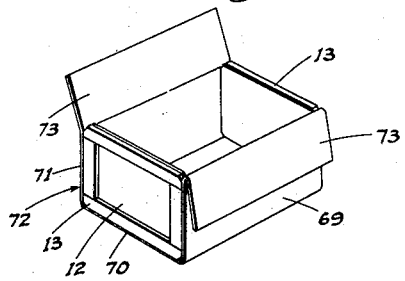
Fig. 29 is a perspective view of a completed box.

The anvil plates 10 are of a peripheral size and width to enter the opening 12 in the rectangular end frames 13 of a box to be made (see Fig. 29).

Operatively connected to each anvil to first advance the same laterally into the box-end openings, to then intermittently turn the anvil through 90° arcs, to raise and lower the same with successive turning movements, and to finally retract the anvil laterally out and clear of the box end, is a mechanism which will now be described. As the mechanism for each anvil is the same, a description of one such mechanism will suffice for both.

With particular reference to Figs. 2–7 and 14–18, such mechanism comprises a shaft 14 secured centrally to the anvil and projecting laterally out therefrom. This shaft is both turnable and slidable in a bushing 15 mounted in a block 16 slidable vertically on post 3. A bevel gear 17 is turnable on bushing 15 laterally out from block 16, and a boss 18 is fixed on the shaft and extends radially therefrom laterally out from the bushing.

A latch pin 19 is slidably mounted in the boss parallel to shaft 14 with its axis in intersecting relation to the minor axis of anvil 9. This pin projects through any one at a time of four evenly spaced holes 20 in the gear 17. These holes are disposed with their axes in intersecting relation to the major and minor axes of the anvil. A spring 21 normally advances the pin so that it projects to adjacent the block 16, and the retracting movement of the pin within the boss is limited so that when fully retracted, the outer end of the pin is nearly flush with the back face of gear 17. A heavier spring 22, about shaft 14 between block 16 and the anvil 9, yieldably holds the latter in its laterally advanced or box-end engaging position; the anvil being capable of retracting movement sufficient to clear the box-end. An anvil-locating roller 23 is mounted on post 3 at a fixed level below block 16 and normally releasably engages in one of two pairs of seats 24 and 25 spaced 90° apart in a cam plate 26 mounted on the back side of the anvil. This plate is of oval form; the seats being arranged thereon so that when the roller is engaged with either one of the pair of seats 24, the anvil is disposed with its greater dimension vertically. When the anvil is turned 90°, and the roller engages one of the pair of seats 25, the anvil is raised; being then disposed with its greater dimension horizontally, but with its upper edge at the same level as that occupied by the upper edge of the anvil when vertically disposed. The purpose of this will be apparent later.

In order to intermittently rotate or turn the anvil—whether the latter is in a raised or lowered position—the following mechanism is provided:

Meshing with gear 17 is a pinion 27 mounted on a depending sleeve-shaft 28 and held in engagement with the gear at all times by a bracket 29 secured on block 16. Slidable in sleeve 28 and having, in effect, splined driving engagement therewith, is a shaft 30 on the lower end of which is a bevel pinion 31; shaft 30 and sleeve 28 forming a telescopic shaft unit.

Another bevel pinion 32 meshes with pinion 31 and is mounted on a transverse shaft 33 turnably supported in the frame uprights 2. Shaft 33 is intermittently driven from the main transverse frame-mounted drive shaft 34 of the nailing machine by a chain drive which comprises an upper sprocket 35 secured on shaft 33, a lower sprocket 36 turnable on shaft 34, and an endless chain 37 connecting the sprockets. The sprocket 36 is releasably or yieldably connected in driving relation with the shaft 34 by a ball 38 engaging a seat 39 formed in one face of the sprocket and mounted in a collar 40 fixed on said shaft. The ball is yieldably held in the seat by a spring 41, and forms in effect a yieldable clutch.

The sprocket ratio is such, relative to the reciprocating strokes of the nailing units of the machine, and which are governed by rotation of shaft 34, that shaft 33 will be turned 90° while the nailing chucks are raised clear of the anvils and the box ends thereon. Then, when the hold-down pressure of the chucks on the anvils prevents their rotation, the sprocket-locking ball 38 yields and releases the sprocket 36 so that the shaft 34 can then make a full turn, to actuate the nailing units and perform a nailing operation without any rotation of the anvils. The gear 17, however, is—at certain times in the cycle of operations—disengaged from shaft 14 so that the anvils are held stationary even though said gear is still being driven by a mechanism which also controls the advance and retraction of the anvils to respectively engage and disengage the box ends when the latter are initially fed to nailing position and when the box has been made and is to be discharged or removed from the machine.

Such mechanism includes a cam member, indicated generally at 42, disposed between gear 17 and block 16 (see Figs. 5–8). This member comprises a hub 43 turnable on the hub of said gear and thus concentric with the shaft; a sloping or wedge-shaped cam surface or element 44 facing and radially positioned to engage the outer end of the pin 19 and a radially projecting lever 45 projecting from the side of the hub 43 opposite surface 44, as shown in Fig. 18.

When the member 42 is in its normal position, the lever 45 is disposed on a downward slope on the leading side of the anvil and gear relative to the direction of rotation thereof.

When the anvil is in its initial upstanding position, the pin 19 is in horizontal alinement with shaft 14 just above the lever as shown in Fig. 14; said pin, at its outer end, being formed with a then down-facing taper surface 46, which is opposed to the cam surface 44 of member 42. The pin 19, which is circular, is maintained in that position relative to the shaft 14 by means of a pin 47 fixed in member 18 and riding in a longitudinal slot 48 in the pin 19 (see Figs. 10–12).

Projecting upwardly from the outer end of lever 45, is a rod 49 which extends alongside the upper portion of the nailing unit 4 of the machine and slides through a boss 50 fixed on said portion (see Figs. 19 and 20). A collar 51 is slidable on the rod below the boss, and a compression spring 52 is disposed about the rod between the collar 51 and a collar 53 fixed on the rod below said collar 51.

Collar 51 is disposed for engagement and lowering by the boss 50, when rod 49 is in a raised position, upon lowering of the nailing units and the descent of the nailing plungers 7 through the chucks; the collar and spring unit providing a yieldable driving connection between the rod 49 and the boss 50. The movement thus imparted to the rod 49, to rotate the cam member 42 in a direction opposite the direction of rotation of gear 17, is sufficient to sweep the cam surface 44 past the pin 19; the pin being then engaged at its outer end and forced back lengthwise to its limit of movement in a retractive direction from its normally advanced position as shown in Fig. 10.

The taper or sloping face 46 of the pin is then disposed for engagement with the correspondingly sloping face 54 of hole 20, as shown in Fig. 11. Then, upon further rotation of the gear, the pin 19 is retracted relative to the gear, but being incapable of further retraction into the boss 18, retracts said boss, together with shaft 14 and the anvil 10, until the pin 19 rides the outer face of gear 17, as shown in Fig. 12.

Initially, the anvils 9 are disposed with their major dimension vertically and in a retracted position. This enables a pair of transversely spaced similarly disposed box ends to be fed forwardly in the machine into alinement with the anvil plates 10 longitudinally and in the transverse planes occupied by said plates 10 when the anvils are advanced. This feeding of the box ends is accomplished by means substantially the same as shown in my Patent No. 2,649,582. This means consists essentially of a pair of transversely spaced pusher plates 55 slidably mounted on rails 56 which are supported on the frame 1 and project from the feed-in end of the machine. The plates 55 are rigidly connected by a cross shaft 57; legs L on the plate 55 being positioned to engage the back edges of box ends 13 and feed them forwardly to an anvil engaging position upon advance of the pusher plates. Such box ends are initially supported in an upstanding position in side hoppers 58 as shown in said patent; the lowest and laterally innermost box end in each hopper, and which is the one engaged by the lugs of the corresponding pusher plate, being supported on a horizontal ledge 59 which extends forwardly to a termination just short of the anvils 9, as shown in Fig. 1.

Each advancing box end then passes onto a floating support 60 mainly below ledge 59 but having end portions 61 normally on a level with said ledge. This support is mounted on a central depending headed pin 62 rigid therewith and projecting with a loose fit through a mounting plate 63 rigid with the adjacent machine post 3. A compression spring 64 about the pin above plate 63 yieldably holds the support at its normal working level, while enabling the same to yieldably rock lengthwise due to the loose fit of the pin in its hole 63a in plate 63 (see Fig. 13).

The supports 60 are positioned to support the box ends when they are alined with the anvils; the box ends being then disposed between the retracted anvils 9 and guide or locating plates 65 supported in connection with rails 56 by brackets 66 depending therefrom laterally inward from said plates (see Figs. 1-3). The plates 55 are reciprocated in timed relation with the operation of the nailing units by a link 67 connected to the cross shaft 57 and to an oscillatory swing arm 68 which is driven in the same manner as shown in said Patent No. 2,649,582.

The operation of the machine as thus far described is as follows:

As previously stated, the anvils 9 are initially disposed in a retracted position and with their major dimension vertically. Each anvil is then yieldably held against rotation and also rigidly supported against any downward movement by the roller 23 which is engaged in a seat 24 of the cam plate 26.

While the anvils are thus disposed, and the nailing units are moving up and down, a pair of box ends is fed to an anvil-engaging position on the supports 60, as above described. During this box-end movement, each gear 17, which is then released from its locking pin 19, continues to rotate until said pin drops into the next gear hole 20. This allows the anvil to advance, by the pressure of spring 22, into the opening 12 of frame 13. The cam member 42 is then in its lowered position, normally maintaining such position of its own weight and so that the cam element 44 is clear of pin 19, as shown in Fig. 14.

Just before this occurs, however, the nailing chucks have been lowered and are in pressing contact with the adjacent side panel 69 of the box, which is fed into position over the upper edge of the box-ends in the manner described later. At this instant, and as the nailing plungers descend to effect a nailing operation, and since the anvils are then held from rotation by the opposed chucks 5 and the supporting rollers 23, the clutch ball 38 yields; disengaging the drive between the main shaft 34 and the gear drive mechanism.

As the nailing chucks then start to raise and relieve the anvils from the holding down pressure thereon, the chuck ball 38 re-engages the sprocket 36, and the rotating drive is again imparted to the anvils. With such rotation, the seat 24 of each cam plate 26 is disengaged from roller 23, and said roller rides the adjacent curved edge 16a of the plate (see Fig. 9) until the roller 23 engages the adjacent seat 25, locating and supporting the anvil in a position with its major axis horizontally, as shown in Fig. 15. Due to the greater distance of seat 25 from the axis of the anvil than the seat 24, the anvil is raised while it thus rotates so that its upper longitudinal edge is disposed at the same level as that occupied by the upper edge of the anvil when in its initial position. By reason of this structure, the box ends are moved, as they rotate, from one nailing position to another while maintaining the same stroke length of the nailing units 4 of the machine.

During this first rotating movement of the anvils and box ends, the latter are still substantially engaged with the supports 60. Due to the floatable and rocking mounting of these supports and to the specific form of the latter, the corners of the box-ends deflect the supports downwardly and pass by the same without interference.

As soon as the anvils have been turned, as above described, the nailing chucks descend, the anvils are held immovable while the bottom panel 70 is being nailed onto said ends 13, and the clutch ball 38 again yields to disengage the anvil drive mechanism as before. With the rotation of each gear 17 which causes and accompanies the above described 90° turning of the corresponding anvil, the pin 19 moves toward the cam element 44, which—when the lever 45 is in a lowered position—is disposed between said pin and the next hole 20 below (see Fig. 15).

As each anvil again rotates through a 90° arc to position the third side edge of the corresponding box-end uppermost for nailing of the corresponding side panel 71 thereon, the pin 19 engages the cam member 42 (at cam element 44) and swings said member about shaft 14 as an axis, raising lever 45 and rod 49, as shown in Fig. 16. The member 42 is mounted for free rotation so that there is no tendency for the pin 19 to be retracted as said pin contacts element 44. Then, when the upper portion of the nailing unit 4 is lowered to effect the necessary nailing of panel 70, the boss 50 engages collar 51, forcing rod 49 down and turning the cam member 42 so that cam element 44 is raised to the position shown in Fig. 17. This causes said element, which is sloping or wedge-shaped, as clearly shown in Figs. 10-12, to move under and engage the pin 19 so as to retract the same as shown in Fig. 11.

This places the sloping face 46 of pin 19—which face is opposite cam element 44—in position for engagement by the sloping face 54 of hole 20, as also shown in Fig. 11. Then, as soon as the nailing operation is completed and the nailing units start to retract from the box and the gear 17 again rotates, the sloping face 54 of hole 20 engages the sloping face 46 of pin 19, forcing said pin back to the outer face of the gear, as shown in Fig. 12. As previously described, this final and simultaneous retraction of both pins retracts the corresponding shafts 14 and the anvils as well so that the box ends are disengaged from the anvils. The box, which is now completed, then rests on the supports 60, ready for withdrawal from the machine. While the anvils are thus retracted, which is during the arcuate movement of gears 17 between adjacent holes 20, the box ends for the next box are fed into place, pushing the box already made out of the machine if such box has not been already removed.

It will be noted that each pin 19 only moves through 180° for the making of each box, and when the anvils are in their upstanding position—as at the conclusion of a box-making operation—they are in the proper position for the initial nailing operation on the subsequent box. The pin 19 of each gear is then under and clear of the cam element 44, and will move downwardly and then upwardly upon further intermittent rotative movements of the gear and anvil until said pin engages another cam element 44a on member 42 at the lever end thereof. This element is disposed in diametrally opposed relation to element 44, and causes the member 42 to be first rotated to lift the lever, and the pin to be then retracted in the same manner as described in connection with the making of the first box.

In order to assure that the side and bottom panels of the box shall be properly alined, transversely of the machine, with the box ends, longitudinally extending locating cam bars 8a (see Figs. 1, 19 and 20) are mounted on the underside of the chuck mounting bars 8. These bars 8a, as the nailing chucks descend to engage the box panels, pass behind and engage the anvil skirts 11, forcing the latter laterally inward the slight distance necessary to accurately aline the box ends and panels, as shown in Fig. 20, and insuring the rigid holding of the anvils in position which the anvil-advancing springs 22 alone do not give.

While the side and bottom panels 69, 71, and 70, respectively, could be separate elements as far as the above described actuation of the anvils is concerned, such elements are—as here shown—integral parts of a continuous wrap-around sheet or matt 72, whose length is sufficient to include the side and end panels, as well as cover flaps 73.

This sheet is fabricated of relatively stiff composition material, such as laminated kraft paper and wood veneer, as indicated in my application Serial No. 521,608, filed July 12, 1955. Said sheet is weakened or scored, as at 74, where bends about the corners of the box ends are to be made.

To hold a supply of the sheets, and to feed one sheet at a time into the machine along with the box ends in the necessary cooperative relation thereto, the following structure is provided:

Projecting lengthwise from the feed-in end of the machine between the hoppers 58, is a sheet hopper 75 which includes horizontal bottom flanges 76 on which the lowermost sheet 72 of a stack rests. These flanges are on a level slightly above that of the upper edge of an anvil-supported box-end, as indicated in Figs. 26–28. Extending lengthwise in the hopper is a hold-down bar 77, yieldably supported and pressed down from above by means of a bellcrank arm 78 rockably mounted intermediate its ends on a hopper-supported cross rod 79 and connected at its upper end to a pull spring 80.

Fixed in connection with and below the hopper centrally of the width thereof, is a longitudinal rail 81 on which a cross head 82 is slidable. This cross head is disposed somewhat back from the pusher plates 55, and is connected thereto for movement therewith by a rigid link 83. A longitudinal arm 84 projects forwardly from the cross head to a forward termination slightly ahead of the pusher plates 55. The arm is pivoted on a transverse pin 85 in the cross head, and is yieldably pressed upwardly by a spring 86 mounted in the cross head (see Fig. 21). At its opposite or forward end, the arm 84 supports a cross feed plate 87 from which a transverse row of short sheet engaging, sharp prongs 88 projects upwardly. These prongs slope forwardly so that while they will press into the adjacent lowest sheet upon forward movement of the arms 84, and so advance the sheet with the arm, said prongs will slide back without moving the sheet upon retractive movement of the arm.

Projecting forwardly at a downward angle from the feed plate 87 is a lip 89, terminating at its upper end in a forwardly projecting sharp edged projection 90 disposed on a level with the top of said feed plate 87. Initially, or when the pusher plates 55 and feed plate 87 connected thereto are fully retracted, said plate 87 is a short distance back from the discharge or machine end of the hopper, as shown in Fig. 21.

The lowest sheet 72, at said discharge end of the hopper, is supported substantially centrally of its width by transversely spaced blocks 91 upstanding from a supporting cross bar 92 (see Fig. 24), and which also mounts the adjacent end of rail 81. The blocks 91 are spaced, and the cross bar 92 arranged so that the feed plate 87 and arm 84 can pass therebetween as said arm reciprocates back and forth from a retracted position.

In the operation of the above described sheet feeding mechanism, the box-end advancing plates 55 are disposed back from the point of initial engagement of the plate-lugs L with the adjacent hopper-supported box ends 13, as shown in Fig. 26. When the pusher plates are thus disposed, the sheet engaging prongs 88 are spaced from the forward end of the sheet 72 in hopper 75 a distance equal to the length of a cover flap 73. Thus, by the time the lugs L engage the box ends 13 for advancing the same into the machine, the sheet 72 has already been advanced sufficient to leave a cover flap 73 beyond and clear of said box ends, as indicated in Fig. 27.

Since the sheet and box ends advance as a unit from that point on, they will maintain such relationship until the box ends reach their final anvil-engaging position in the machine, as indicated in Fig. 28, following which the pusher plates and sheet feed plate retract, to pick up the next box ends and wrap-around sheet, for subsequent advance, while the nailing operations are being performed on the box parts previously advanced.

At the time the sheet 72 to be fed is first engaged by the feed prongs 88, the final flap-forming portion 73 of the previously fed sheet is still a short distance inside the hopper, as indicated in Fig. 21. The end of such flap portion is engaged by the lip 89 adjacent the upper end thereof; the slope of the lip assuring such engagement even though the flap end has a transverse sag. Advancing of the feed plate 87 thus advances both the flap and the next sheet above. However, previous to the engagement of said next sheet by the feed plate, it is necessary to prevent such sheet from being dragged out of the hopper by contact with the advancing sheet below, and of which the flap noted above is a part. At the same time, it is necessary to enable said sheet above to be pushed from the hopper when engaged by the feed plate.

This control of the sheet movement is effected by the following means:

Upstanding from the discharge end of the hopper centrally of the width thereof is a gate 93 slidable in a housing 94 and yieldably urged downwardly, to a hopper closing position, by a spring 95 in the housing. The housing is, at its upper end, rigid with a pair of transversely spaced bars 96 in the hopper 75 at the top thereof, and which bars are supported by cross rod 79 and another cross rod 79a extending across the hopper and disposed near the housing.

The gate, at its upper end, includes an upstanding rod 97 engaged above the housing 95 by the substantially horizontal leg 98 of a bellcrank 99 disposed between and pivotally supported from bars 96. Said leg 98 normally rests on top of the housing 95, and the rod 97 has adjustable nuts 100 thereon above the leg, so as to enable the gate to be lifted thereby and also to limit the downward movement of the gate by the spring 94.

Figure 24:
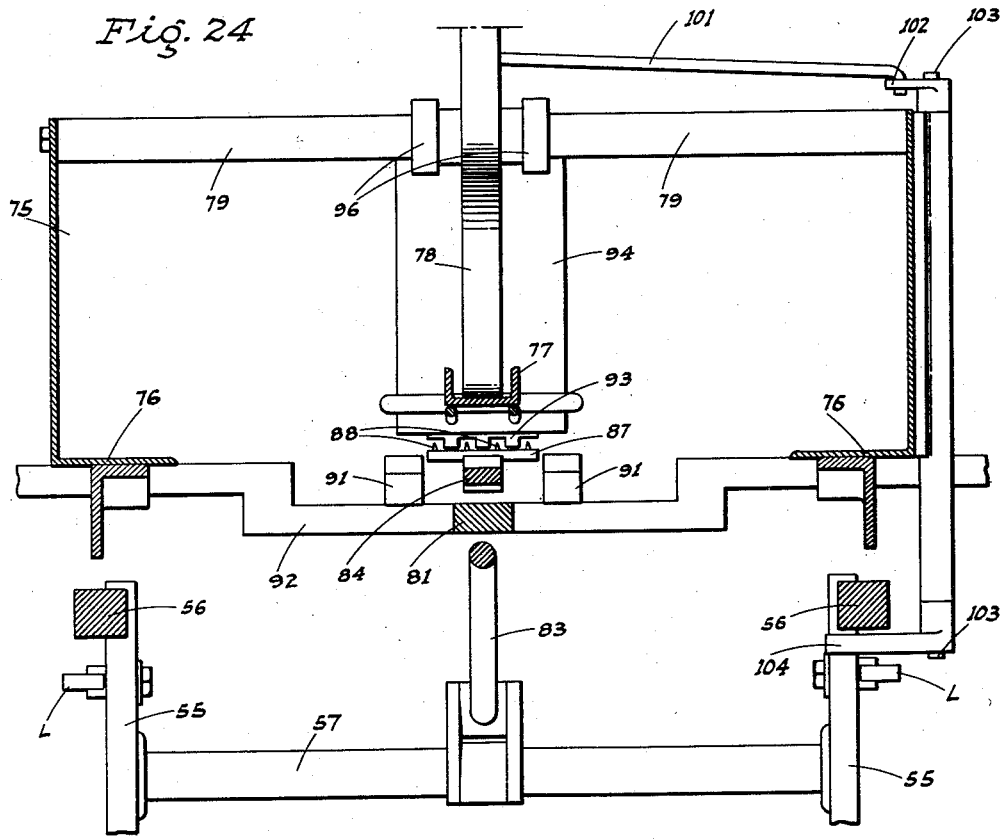
Fig. 24 is a transverse section on line 24—24 of Fig. 21.

In order to lift the gate during the movement of the pusher plates at their extreme retracted position only, a pull rod 101 extends between and is connected to the upstanding leg of the bellcrank 99 and to a radial arm 102 fixed on the upper end of an upstanding shaft 103 mounted on the outside of the hopper 75 and laterally out from the adjacent pusher plate 55 (see Fig. 24). This shaft is disposed in a position lengthwise of the hopper, adjacent that occupied by the pusher plates when fully retracted.

Figure 25:
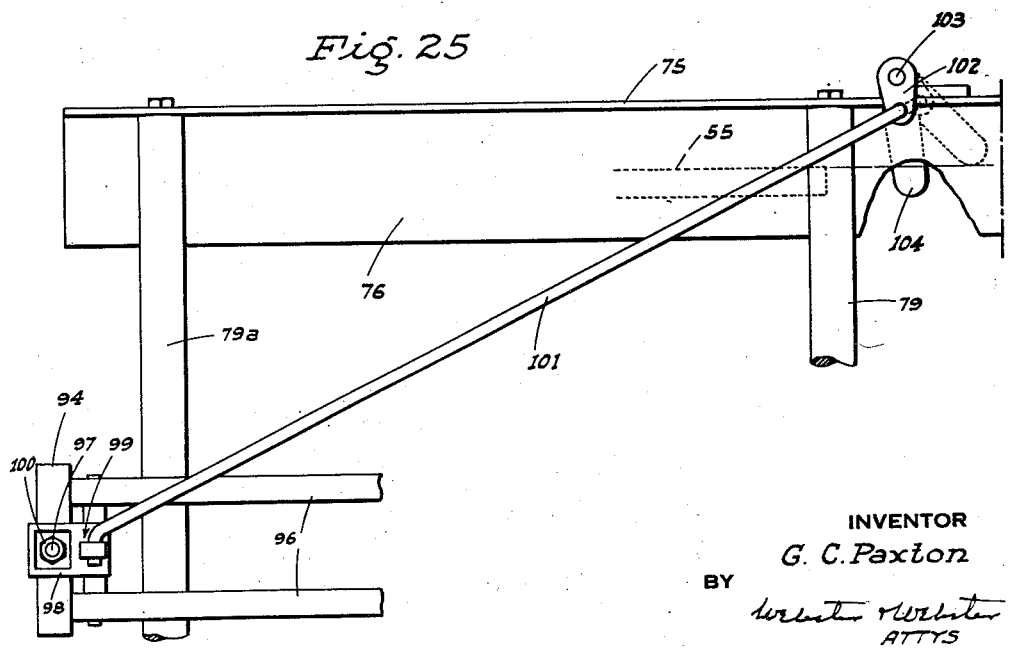
Fig. 25 is a fragmentary plan view of the sheet hopper, showing particularly the sheet-stop actuating mechanism.

Secured on the lower end of shaft 103 is a radial actuating arm 104 which when the gate is down, projects laterally and substantially at right angles, into the path of retracting movement of said plate 55, as indicated in Fig. 25. Then, when adjacent pusher plate moves to its fully retracted position, said plate engages the actuating arm 104, and swings the same to the position indicated by dotted lines in Fig. 25. This causes the arm 102 to be turned a corresponding amount, pulling on rod 101 and lifting the bellcrank arm 98 and the gate suspended therefrom. Since the feed plate prongs 88 pushingly engage the bottom sheet 72 the instant the pusher plates 55 start to advance, the gate will be held lifted and open until the forward end of said sheet 72 has been advanced beyond the gate. As soon as the pusher plate leaves and disengages arm 104, spring 95 acts to lower the gate so that it yieldably rests on sheet 72 and the arm 104 is restored to its initial position as soon as the flap portion 73 of the first sheet 72 has been withdrawn or pushed from the hopper.

It should here be stated that the anvils and box ends thereon are rotated in a direction such that their upper edges move away from the hopper. Thus, after the first side panel portion 69 of sheet 72 has been nailed to the box ends, the subsequent rotative movements of the anvils and box ends pulls the remaining portion of the sheet 72 from the hopper 75, even though the feed plate 87 is then retracting. When the box being made has reached its completed stage, however, a part of the final flap-forming portion of the sheet is still disposed in the hopper as previously stated and as shown in Fig. 27. Since the level of the sheet-supporting flanges 76 of hopper 75 is above the level of the top of the anvil-supported box, no interference is had with the engagement of the exposed uncovered edge of the box ends of said completed box with the next pair of box-ends being advanced, and which push the completed box out of the machine after the anvils have been retracted laterally therefrom as previously explained.

It should also be noted that upon turning of the box structure being made to the position of final nailing, the initially projecting cover flap 73, by contact with the support 60, becomes folded back against the side panel 69, as indicated in Fig. 26.

From the foregoing description, it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. In a machine for assembling and nailing together the parts of a box which includes box ends and a unitary sheet to form the sides and bottom of the box, the machine including transversely spaced nailing units, rotary anvils to engage and support a pair of box ends in turning relation therewith and with an upper edge of the box ends in position for nailing, means to feed a sheet onto said box end with the forward end portion of the sheet resting on said upper edge of the anvil supported box ends for nailing thereto, and means functioning upon rotation of the anvils subsequent to a nailing operation to correspondingly rotate the box ends so as to pull on the sheet and advance the same in wrap-around relation to said box ends.

2. In a box making machine having a nailing unit reciprocable vertically to and from a nailing level, a rotary nailing anvil to engage and support a rectangular non-square box end for rotation therewith and in position for nailing, means to rotate the anvil through intermittent 90° arcs of rotation, and means functioning upon rotation of the anvil through each arc to raise or lower the anvil so as to dispose any upper edge of the box end adjacent said nailing level.

3. In a machine for assembling and nailing box parts which include frame-like box ends each having a non-circular opening therein, the machine including means to advance a pair of box ends into position for nailing, initially retracted anvils shaped to engage in the box-end openings to then support such box-ends for nailing, and means to advance the anvils into said openings after said box ends have been thus advanced.

4. A structure, as in claim 3, with means functioning automatically to laterally retract the anvils subsequent to the third successive nailing operation.

5. A structure, as in claim 3, with a downwardly yieldable and rockable support for each box end when the latter is so advanced to a nailing position.

6. A structure, as in claim 3, with a skirt projecting outwardly in a vertical plane parallel to the anvil from the laterally outer face thereof to aline and guide the adjacent side edge of the side and bottom forming box parts with the box end supported on the anvil.

7. In a box making machine having a nailing unit reciprocable vertically to and from a nailing level, a laterally movable initially retracted anvil below the nailing unit arranged when laterally advanced to engage and support a box-end in position for nailing and for rotation therewith, means to advance a box end in a direction lengthwise of the machine into longitudinal and transverse alinement with the nailing unit while the anvil is retracted, means to then advance the anvil into a box-end engaging and supporting position, means functioning between successive nailing operations to rotate the anvil through successive 90° turns, and means functioning subsequent to the third successive nailing operation to retract the anvil from the box end whereby to allow of the withdrawal of the box from the machine lengthwise thereof.

8. In a machine for assembling and nailing box-parts which include box-ends and a wrap-around sheet to form the sides and bottom of the box, the machine including means to support a pair of box ends in transversely spaced relation and in position for nailing, means to feed a sheet onto the positioned box ends for an initial nailing operation, and means to intermittently rotate the box ends in unison so as to cause other portions of the sheet to be engaged with the box ends in wrap-around relation for successive nailing operations.

9. In a machine for assembling and nailing box parts which include box-ends and an element to form a box-side, the machine including nailing units movable downwardly to first engage a box-end supported element and then nail such element to the box-ends, means to feed the box-ends and element into position for nailing, and means functioning upon descent of the nailing units to an element engaging position to aline the box-ends with the side edges of the element prior to a nailing operation being effected.

10. In a machine for assembling and nailing box-parts which include box-ends and an element to form a box-side, the machine including nailing units movable downwardly to effect a nailing operation and including nail chucks to engage a box-end supported element before such nailing operation is effected, means to feed a pair of box-ends into position for nailing and for the reception of a box-side element thereon, laterally movable anvils to engage and support the box-ends and having outwardly projecting skirts overlapping the side edges of said element, and means functioning upon movement of the chucks to an element-engaging position to exert laterally inward pressure against the anvils to cause the same to aline the box-ends with the side edges of said element.

11. A structure, as in claim 10, in which said last named means comprises a horizontal cam bar fixed in connection with the chucks of each nailing unit in position to pass back of and engage the corresponding anvil just prior to the engagement of the chucks with the box-side element.

12. A box-end supporting rotary anvil unit for a box-part assembling and nailing machine which includes an upstanding mounting post; said unit comprising an anvil plate, a central shaft rigid with and projecting from the back of the anvil plate, a block in which the shaft is turnably supported, mounted on the post, power means to rotate the shaft, and a yieldable clutch included in said power means.

13. A box-end supporting rotary anvil unit for a box-part assembling and nailing machine which includes an upstanding mounting post; said unit comprising an anvil plate, a central shaft rigid with and projecting from the back of the anvil plate, a block in which the shaft is turnably supported, mounted on the post, the block being slidable on the post, means to rotate the shaft, and means functioning upon rotation of the shaft to raise or lower the block with each 90° turn of the shaft.

14. A structure, as in claim 13, in which said last named means comprises a roller fixed on the post below the block and projecting toward the anvil plate, and a substantially oval cam plate fixed on the back of the anvil plate about the shaft and whose peripheral edge is engaged by the roller.

15. A structure, as in claim 14, in which said peripheral edge of the cam plate is formed with roller-engaging seats on the major and minor axes thereof; the anvil plate having peripheral edges parallel to said axes.

16. A box-end supporting rotary anvil unit for a box-part assembling and nailing machine which includes an upstanding mounting post; and a vertically reciprocable nailing unit to engage a box-end supported on the anvil unit, said unit comprising an anvil plate, a central shaft rigid with said plate and projecting from the back side thereof, a block mounted on the post in which the shaft is turnably and slidably supported, means to rotate the shaft, and means functioning upon movement of the nailing unit to a nailing position subsequent to the third nailing operation, to slide the shaft laterally out to withdraw the anvil plate from a box-end supporting position.

17. A structure, as in claim 16, with means included in the shaft rotating means to cause the rotation of the shaft to be halted while the withdrawal of the anvil plate is being effected.

18. A box-end supporting rotary anvil unit for a box-part assembling and nailing machine which includes an upstanding mounting post; and a vertically reciprocable nailing unit to engage a box-end supported on the anvil unit, said unit comprising an anvil plate, a central shaft rigid with said plate and projecting from the back side thereof, a block mounted on the post in which the shaft is turnably and slidably supported, a gear turnable on the shaft, means to drive the gear, a releasable latch pin connecting the gear and shaft, said pin being parallel to the shaft and arranged to retract the shaft therewith subsequent to an initial retracting movement of the pin, means functioning upon movement of the nailing unit to effect a nailing operation to thus initially retract the pin, a co-acting cam surface on the gear and pin to then cause a further retraction of the pin to be effected as the gear rotates.

19. A structure, as in claim 18, with means included in the gear drive means to discontinue the driving of the gear while the pin is being initially retracted.

20. A structure, as in claim 18, with a plurality of circumferentially spaced openings in the gear to successively receive the pin in latching relation, and a spring acting on the anvil plate to advance the same to a box-end supporting position subsequent to a retracting movement thereof whereby the pin will enter one of the openings subsequent to a retraction of the pin and upon a further rotation of the gear.

21. A box-end supporting rotary anvil unit for a box-part assembling and nailing machine which includes an upstanding mounting post; and a vertically reciprocable nailing unit to engage a box-end supported on the anvil unit, said unit comprisng an anvil plate, a central shaft rigid with said plate and projecting from the back side thereof, a block mounted on the post in which the shaft is turnably and slidably supported, a gear turnable on the shaft, means to drive the gear, a releasable latch pin connecting the gear and shaft, said pin being parallel to the shaft and arranged to retract the shaft therewith subsequent to an initial retracting movement of the pin, the pin before retraction projecting through the gear to provide a terminal portion exposed between the gear and block, a rotary member turnably axially of the shaft and including a cam element in the path of rotation of said portion of the pin and arranged to impart initial retractive movement to the pin upon turning of said member in a direction opposite to the direction of rotation of the gear, and means functioning upon movement of the nailing unit to effect a nailing operation to thus turn said member.

22. A structure, as in claim 21, in which the last named means comprises an actuating rod extending upwardly from the member to one side of the shaft to a termination alongside the nailing unit, and cooperating elements on the rod and unit to actuate the rod upon downward movement of the nailing unit to effect a nailing operation.

23. In a machine for assembling and nailing box parts, the machine including rotary anvils to support a pair of box ends for nailing, and means to automatically disengage the anvils after the third nailing operation.

24. In a machine for assembling and nailing box parts, the machine including rotary anvils to support a pair of box ends for nailing, means to automatically move a pair of box ends into supported position on the anvils, and means to automatically disengage the anvils from the box ends after a third nailing operation.

References Cited in the file of this patent

UNITED STATES PATENTS

| | | |
|---|---|---|
| 1,226,907 | Northrup | May 22, 1917 |
| 1,844,333 | Northrup | Feb. 9, 1932 |
| 1,898,192 | Larsen | Feb. 21, 1933 |
| 2,488,757 | Benson | Nov. 22, 1949 |
| 2,522,316 | Steiner | Sept. 12, 1950 |
| 2,557,889 | Paxton | June 19, 1951 |
| 2,649,582 | Paxton | Aug. 25, 1953 |